United States Patent [19]

Carlick et al.

[11] Patent Number: 4,469,826

[45] Date of Patent: Sep. 4, 1984

[54] PROCESS FOR THE PRODUCTION OF DISPERSIONS OF POLYMERS IN NON-AQUEOUS VEHICLES

[75] Inventors: Daniel J. Carlick, Livingston; Olgierd Wasilewski, Edison, both of N.J.

[73] Assignee: Sun Chemical Corporation, New York, N.Y.

[21] Appl. No.: 500,556

[22] Filed: Jun. 2, 1983

[51] Int. Cl.$^3$ .................... C09D 11/02; C09D 11/08; C09D 11/10
[52] U.S. Cl. ........................................ 523/339; 106/20; 106/30; 523/332; 523/335; 523/352; 260/DIG. 38
[58] Field of Search .................... 106/20, 30; 523/332, 523/335, 339, 352; 260/DIG. 38

[56] References Cited

U.S. PATENT DOCUMENTS

| | | | |
|---|---|---|---|
| 2,460,582 | 2/1949 | Japs | 523/339 |
| 3,024,213 | 3/1962 | Ludlow | 524/318 |
| 3,415,772 | 12/1968 | La Heij et al. | 523/339 |
| 3,424,705 | 1/1969 | La Heij et al. | 523/339 |
| 3,760,724 | 9/1973 | Budzinski et al. | 524/297 |
| 4,052,353 | 10/1977 | Scanley | 523/335 |
| 4,162,997 | 7/1979 | Walsh | 524/523 |
| 4,248,746 | 2/1981 | Greiner | 524/563 |
| 4,391,638 | 7/1983 | Fusco et al. | 106/20 |

*Primary Examiner*—Ronald W. Griffin
*Attorney, Agent, or Firm*—Cynthia Berlow

[57] ABSTRACT

Dispersions of polymer particles in non-aqueous vehicles are prepared by transferring the finely-divided polymer particles directly from an aqueous latex containing about 5 percent to 60 percent by weight of the polymer particles into the non-aqueous vehicle. The resulting dispersions can be used in the production of lithographic inks.

16 Claims, No Drawings

PROCESS FOR THE PRODUCTION OF DISPERSIONS OF POLYMERS IN NON-AQUEOUS VEHICLES

This invention relates to a process for the production of polymer dispersions in non-aqueous vehicles. More particularly it relates to a process for the production of fine dispersions of thermoplastic polymers in lithographic printing ink vehicles in which polymer particles are transferred from the aqueous phase of a polymer latex into the water-immiscible, hydrophobic organic vehicle. It further relates to polymer dispersions produced by this process and to lithographic inks that comprise these polymer dispersions.

In general, in order to enhance the dry film properties of printing inks, high molecular weight resins and polymers are used in the vehicle. These usually impart to the ink good printing qualities, toughness, and other desired properties. It is, however, well recognized in the art of printing inks that the use of high molecular weight materials results in high tack and high viscosity. Printing processes and other considerations, however, limit the viscosity of the inks, and this in turn limits the concentration and type of resins and polymers that can be used.

In some types of printing inks, such as fusion inks, the limit on the use of high molecular weight polymers has been extended. In such inks high molecular weight polymers are used in a dispersed or discontinuous phase. It is essential that this phase be well dispersed in order to prevent printing problems and other undesirable characteristics of the ink product.

There are a number of processes for the production of polymer dispersions in non-aqueous vehicles disclosed in the prior art, all of which teach the dispersion of dry powdered polymer in the vehicle by conventional means, such as grinding on a three-roll mill. For example, in U.S. Pat. No. 3,024,213, Ludlow suggested sifting a dry vinyl resin in order to eliminate lumps while the polymer and vehicle were mixed and then passed through a three-roll mill. Budzinski in U.S. Pat. No. 3,760,724 described a process for producing the desired fineness of polymer dispersion by milling, while Grainer in U.S. Pat. No. 4,248,746 used controlled precipitation of polymer from solution and/or grinding to produce polymer particles of optimum size. Walsh in U.S. Pat. No. 4,162,997 disclosed a process in which non-volatile, heat-set vehicles for printing inks can be made by dispersing particulate, glassy thermoplastic polymer binders in a soft resinous phase and a diluent phase in a mixer, for example, a Hoover Automatic Muller, until a uniform paste is obtained. The thermoplastic particles that Walsh used can be obtained by evaporating the water from aqueous dispersions of styrene-type polymers or the diluent from emulsion or dispersion polymerized systems of polyacrylate-type polymers, or they can be prepared by grinding or milling suitable thermoplastic polymers, by controlled precipitation from solution, or by high shear dispersion of molten polymer in a non-solvent, followed by cooling and drying. In many cases, a particle size classification process is necessary to obtain polymer particles of the optimum size.

These processes for the production of polymer dispersions are time-consuming, relatively costly, and inefficient to carry out on a commercial scale. They generally yield products that do not have uniform particle size distribution properties and that form printing inks that do not have the desired fineness of dispersion or rheological properties.

This invention relates to an improved process for the production of dispersions of thermoplastic polymers in non-aqueous vehicles. In this process, the polymer particles are transferred directly from an aqueous latex into the non-aqueous vehicle without using the polymer separation, drying, grinding, and classifying steps that are required by the processes of the prior art. This process, therefore, provides a more economical and more efficient way of producing on a commercial scale dispersions of finely-divided thermoplastic polymers in non-aqueous vehicles such as lithographic printing ink vehicles. These dispersions which have uniform particle size distribution form printing inks that have good printability and excellent rheological properties.

In the process of this invention, an aqueous thermoplastic polymer latex is coagulated, a lithographic ink vehicle or other non-aqueous vehicle is added, and the resulting mixture is agitated until it separates into an organic phase and a clear, solids-free water phase. After removal of the water phase, agitation is continued, first under atmospheric pressure and then under vacuum, and the separated water is removed until the water content of the organic phase has been reduced to less than 2 percent by weight. The resulting dispersion can then be diluted to the desired consistency and/or polymer concentration by the addition of a low viscosity diluent. It may then be mixed with pigments and other additives to form lithographic inks.

In the first step of this process, a coagulating agent is added to an aqueous thermoplastic polymer latex and the mixture is stirred until the latex is fully coagulated. At this point the consistency of the latex has changed from a liquid to a paste. When a uniform paste has been obtained, a non-aqueous vehicle, usually a compatible lithographic ink vehicle, and in most cases a defoamer are added to it. Agitation of the mixture is continued to separate an aqueous phase from the coagulated latex. The aqueous phase is removed, and the agitation is continued to separate additional water from the mixture repeatedly until about 60 percent to 70 percent of the water originally present in the latex has been removed. The mixture is then agitated under a vacuum of about 60 to 100 mm Hg at a temperature in the range of about 35° to 40° C. until its water content has been reduced to less than about 2 percent by weight. The resulting dispersion of polymer in a lithographic ink vehicle may be diluted with a lithographic ink varnish or other low viscosity diluent to the desired concentration.

The latexes that are used in the process of this invention are aqueous dispersions that contain about 5 percent to 60 percent, and preferably 40 percent to 60 percent, by weight of a thermoplastic polymer that may be, for example, a vinyl halide homopolymer or copolymer, a styrene homopolymer or copolymer, an acrylic polymer, or a mixture thereof. The average particle size of the polymer in the latex is in the range of about 0.05 micron to about 2 microns, and preferably in the range of 0.1 micron to 0.3 micron. When latexes containing appreciable amounts of larger or smaller particles are used, printing inks prepared from the dispersions generally do not have the required rheology and gloss.

Coagulation of the latex is effected by adding to it a coagulating agent that is preferably aluminum sulfate, herein referred to as alum, alone in combination with a fatty alcohol having 4 to 18 carbon atoms, a fatty acid having 6 to 12 carbon atoms, a multivalent metal salt, or another suitable coagulant. The coagulating agent preferably contains about 1 part to 10 parts by weight of a fatty alcohol having 10 to 14 carbon atoms per part by weight of alum. Optimum results have been obtained using a coagulating agent that contains 1.5 to 5 parts by weight of dodecanol per part by weight of alum.

While the reasons for the improved results that are obtained when a fatty alcohol having 10 to 14 carbon atoms is used in combination with alum are not now fully understood, it has been found that the alcohol enhances the process of coagulation, separation of water, and transfer of polymer particles into the lithographic ink vehicle.

The amount of the coagulating agent used is that which will provide rapid and complete coagulation of the latex. In most cases, about 0.5 part to 2 parts by weight of alum and about 0.5 part to 5 parts by weight of a fatty alcohol are used per 100 parts by weight of the latex.

To produce a more uniform coagulate, the alum is preferably added to the latex as a 25 percent to 50 percent aqueous solution.

The non-aqueous vehicle that is added to the coagulated thermoplastic polymer latex in the first step of the process of this invention is usually a lithographic ink vehicle that is a solution of about 5 percent to 50 percent by weight of a hard or tackifying resin in about 5 percent to 60 percent by weight of a plasticizer, the weights being based on the weight of the finished lithographic ink. It preferably contains from 10 percent to 25 percent by weight of the resin and 20 percent to 50 percent by weight of the plasticizer, based on the weight of the ink.

The amount of the lithographic ink vehicle that is added to the coagulated latex is dependent upon a number of factors including the color and other properties desired in the finished ink. In most cases, it is the amount that will provide about 1 part by weight of hard resin per part by weight of polymer in a coagulated latex.

The hard or tackifying resins that are suitable for use in the lithographic ink vehicles are those resins that are well known in the art of ink making for their exellent lithographic properties and good pigment wetting capabilities. These include alkyd resins, urethane-modified alkyd resins, rosin-modified phenolic resins, hydrocarbon resins, rosin esters, polyketones, and the like. Their choice is governed by compatibility considerations. Mixtures that have melting points in the range of about 100° to 150° C. are useful in formulating fusion-type inks.

The useful plasticizers are secondary plasticizers or sterically-hindered primary plasticizers that do not swell the rubber rollers used on printing presses and that are substantially non-volatile. These include aliphatic, aromatic, and naphthenic hydrocarbon oils, esters of dicarboxylic acids such as phtahlic acid and adipic acid, long chain esters, polymeric plasticizers, and mixtures thereof. The plasticizers preferably have Brookfield viscosities at 25° C. in the range of about 300 to 600 centipoises.

The hard resin and the plasticizer are used to provide a continuous phase for dispersion of the thermoplastic polymer. The resin also provides the necessary tack, viscosity, and rheology of the ink and functions as a dispersing medium for the pigment.

A defoamer may be incorporated into the lithographic ink vehicle or added separately to the coagulated latex and lithographic ink vehicle. The amount of defoamer used is in the range of about 0.1 percent to 2 percent by weight, and preferably about 0.5 percent to 1 percent by weight, based on the weight of the finished ink.

Any of the defoamers that are used commercially to control foaming in polymer latexes and that are compatible with lithographic processes may be used in this process. Excellent results have been obtained using, for example, a defoamer that is a blend of silica derivatives, hydrocarbons, and silicones (such as Drew Chemical Defoamer L 418).

The polymer dispersions prepared by this process generally contain about 40 percent to 60 percent by weight of finely-divided thermoplastic polymer, about 40 percent to 60 percent by weight of lithographic ink vehicle, about 1 percent to 2 percent by weight of a fatty alcohol, and about 0.1 percent to 1 percent by weight of defoamer.

The dispersion of finely-divided thermoplastic polymer in lithographic ink vehicle that is the product of the first step of this process is then brought to the desired consistency and/or concentration of polymer by the addition of a diluent that may be, for example, a hydrocarbon solvent, plasticizer, or lithographic ink varnish.

The diluted dispersion may then be combined with one or more pigments and such additives as waxes, surfactants, bodying agents, and the like in the amounts ordinarily used for the purposes intended to form lithographic inks. These inks are characterized by high tinctorial values and by excellent rheological properties.

The hard resins, plasticizers, diluents, pigments, and additives that are used in this process include those that were disclosed by Walsh in U.S. Pat. No. 4,162,997, which is incorporated herein by reference.

The preparation of the thermoplastic polymer dispersions by the process of this invention and the production of lithographic inks that comprise these dispersions may be carried out in any vessel that is suitable for a high torque operation, that is equipped to provide agitation and temperature conrol at both atmospheric and subatmospheric pressures, and from which water can be removed, for example, by decantation.

The invention is further illustrated by the following examples. In these examples all parts are parts by weight and all percentages are percentages by weight.

EXAMPLE 1

62 Parts of a vinyl chloride-vinyl acetate copolymer latex that contained 56 percent solids and that had a specific gravity of 1.18, a glass transition temperature of 85° C., and a pH of 7.0 was charged to a vessel and agitated while 1 part of n-dodecanol and 1.4 parts of a 40 percent aqueous solution of alum were slowly added to it. Agitation was continued for 20 to 30 minutes to produce a completely homogeneous coagulated latex. When coagulation occurred, the latex changed in consistency from a liquid to a paste. To the uniform paste were added 17 parts of a lithographic ink vehicle that contained 10.2 parts of an aromatic hydrocarbon resin (Hercules Picco 6140) and 6.64 parts of an aromatic hydrocarbon oil (Monsanto HB 40) and 0.16 part of Defoamer L 419. After the mixture had been agitated for 20 to 30 minutes, a clear, solids-free water phase separated and was removed from the vessel by decantation. The agitation was continued and additional amounts of water separated and were removed from the vessel until about 70 percent of the water originally present in the latex had been removed. The mixture was then agitated under a vacuum of 60 to 100 mm Hg at 35° to 40° C. for about 3 hours to reduce its water content to less than 2 percent.

The resulting dispersion was diluted with a lithographic ink vehicle to form a highly viscous, translucent, free-flowing dispersion of a vinyl chloride-vinyl acetate copolymer in a lithographic ink vehicle.

The product contained 48.4 percent of the copolymer, 50.0 percent of the lithographic ink vehicle, 1.4 percent of n-dodecanol, and 0.2 percent of the defoamer.

It was diluted with a hydrocarbon solvent and then blended with phthalocyanine blue pigment and conventional additives to form a lithographic printing ink.

EXAMPLE 2

62.8 Parts of a polyvinyl chloride latex that contained 56 percent solids and that had a specific gravity of 1.18, a glass transition temperature of 69° C., and a pH of 7.0 was charged to a vessel and agitated while 1.6 parts of n-dodecanol and 1.6 parts of a 40 percent aqueous solution of alum were slowly added to it. Agitation was continued for 30 minutes to produce a completely coagulated latex. To the coagulated latex were added 18.4 parts of a lithographic ink vehicle that was a solution of a rosin-modified phenolic resin (Union Camp Unirez 9021) in a complex phthalate ester (Monsanto Santicizer 278) and 0.2 part of a defoamer. The mixture was agitated, first at atmospheric pressure and then under vacuum, and the separated water was removed from it until it contained less than 2 percent of water.

The resulting dispersion was diluted with 15.2 parts of a lithographic ink vehicle to form a viscous, translucent, free-flowing dispersion of polyvinyl chloride in a lithographic ink varnish. The dispersion ws diluted with a hydrocarbon solvent and blended with barium lithol red pigment and conventional additives to form a lithographic printing ink.

EXAMPLE 3

65.3 Parts of a polystyrene latex that contained 50.5 percent solids and that had a pH of 11.5 was mixed with 1.5 parts of n-dodecanol and 0.5 part of a 40 percent aqueous solution of alum until a completely coagulated latex was obtained. 32.6 Parts of a lithographic ink vehicle that was a solution of a rosin ester (Hercules Neolyn 23) in a hydrocarbon oil (Sunoco Sunthene 410) and 0.5 part of a defoamer were added to the coagulated latex, and water was removed from the mixture by the procedure described in Example 1.

The product was a viscous, translucent, free-flowing dispersion of polystyrene in a lithographic ink vehicle. It was diluted with a hydrocarbon solvent and blended with diarylide yellow pigment and conventional additives to form a lithographic printing ink.

EXAMPLE 4

The procedure of Example 2 was repeated except that the coagulating agent was 50 percent aqueous solution of alum. The results were comparable.

EXAMPLE 5 (Comparative)

The procedure of Example 2 was repeated except that the coagulating agent was n-dodecanol. There was no water separation.

Each of the other thermoplastic polymers, coagulating agents, and non-aqueous vehicles disclosed herein may be used in a similar manner to produce polymer dispersions that are useful in the production of lithographic printing inks.

What is claimed is:

1. In a process for the production of dispersions of finely-divided polymer particles in non-aqueous vehicles wherein an aqueous latex containing about 5 percent to 60 percent by weight of a thermoplastic polymer is coagulated, a non-aqueous vehicle is added to the coagulated latex, the mixture of coagulated latex and vehicle is agitated until a water phase separates, and the water phase is separated from the dispersion of polymer in the non-aqueous vehicle, the improvement wherein the aqueous latex is coagulated by adding to it a coagulating agent that consists of alum and a fatty alcohol having 10 to 14 carbon atoms in the amount of about 1 part to 10 parts by weight of alcohol per part by weight of alum, said dispersions of finely-divided polymer particles in non-aqueous vehicles being suitable for use in lithographic printing inks.

2. The process of claim 20 that comprises the steps of
   (a) coagulating an aqueous latex containing about 5 percent to 60 percent by weight of a thermoplastic polymer by adding to it a coagulating agent that consists of alum and a fatty alcohol having 10 to 14 carbon atoms in the amount of about 1 part to 10 parts by weight of alcohol per part by weight of alum,
   (b) adding to the coagulated latex a non-aqueous vehicle,
   (c) agitating the mixture of said coagulated latex and non-aqueous vehicle until a water phase separates from the dispersion of polymer in the non-aqueous vehicle,
   (d) removing the separated water from said dispersion, and
   (e) repeating steps (c) and (d) until the dispersion contains less than 2 percent by weight of water.

3. The process of claim 2 wherein in step (a) the aqueous latex is coagulated by adding to it a coagulating agent that contains alum and dodecanol in the amount of 1.5 parts to 5 parts by weight of dodecanol per part by weight of alum.

4. The process of claim 6 wherein 0.5 part to 2 parts by weight of alum and 0.5 part to 5 parts by weight of dodecanol are added, based on the weight of the aqueous latex.

5. The process of claim 2 wherein alum is added to the aqueous latex as a 25 percent to 50 percent aqueous solution.

6. The process of claim 1 wherein in step (b) a defoamer is added to the coagulated latex.

7. The process of claim 1 wherein the latex contains about 5 percent to 60 percent by weight of a polymer selected from the group consisting of vinyl halide homopolymers and copolymers, styrene homopolymers and copolymers, acrylic polymers, and mixtures thereof, said polymer having an average particle size in the range of 0.05 micron to 2 microns.

8. The process of claim 7 wherein the latex contains about 40 percent to 60 percent by weight of polymer having an average particle size in the range of 0.1 micron to 0.3 micron.

9. The process of claim 1 wherein the polymer in the aqueous latex is polyvinyl chloride.

10. The process of claim 1 wherein the polymer in the aqueous latex is a vinyl chloride-vinyl acetate copolymer.

11. The process of claim 1 wherein the non-aqueous vehicle is a lithographic ink vehicle.

12. The process of claim 11 wherein the lithographic ink vehicle is a solution of about 5 percent to 50 percent by weight of a hard resin in about 5 percent to 60 percent by weight of a plasticizer, said weights being based on the weight of the finished dispersion.

13. The process of claim 12 wherein the hard resin is selected from the group consisting of alkyd resins, urethane-modified alkyd resins, hydrocrbon resins, rosin esters, rosin-modified phenolic resins, polyketones, and mixtures thereof.

14. The process of claim 12 wherein the plasticizer is selected from the group consisting of hydrocarbon oils, long-chain esters, hindered phthalates, hindered adipates, polymeric plasticizers, and mixtures thereof.

15. The product that is prepared by the process of claim 1.

16. A lithographic printing ink that comprises the product of the process of claim 1 and a pigment.

* * * * *